(12) United States Patent
Mityagin

(10) Patent No.: US 9,843,446 B2
(45) Date of Patent: Dec. 12, 2017

(54) SYSTEM AND METHOD FOR ROTATING CLIENT SECURITY KEYS

(71) Applicant: Dropbox, Inc., San Francisco, CA (US)

(72) Inventor: Anton Mityagin, San Francisco, CA (US)

(73) Assignee: DROPBOX, INC., San Francisco, CA (US)

(*) Notice: Subject to any disclaimer, the term of this patent is extended or adjusted under 35 U.S.C. 154(b) by 0 days.

(21) Appl. No.: 14/513,938

(22) Filed: Oct. 14, 2014

(65) Prior Publication Data

US 2016/0105283 A1  Apr. 14, 2016

(51) Int. Cl.
  *H04L 9/08* (2006.01)
  *H04L 9/16* (2006.01)
  *H04L 29/06* (2006.01)
  *H04L 9/12* (2006.01)

(52) U.S. Cl.
  CPC .............. *H04L 9/0891* (2013.01); *H04L 9/08* (2013.01); *H04L 9/0819* (2013.01); *H04L 9/12* (2013.01); *H04L 9/16* (2013.01); *H04L 63/0428* (2013.01)

(58) Field of Classification Search
  CPC .......... H04L 9/08; H04L 9/16; H04L 63/0428
  See application file for complete search history.

(56) References Cited

U.S. PATENT DOCUMENTS

| | | | | |
|---|---|---|---|---|
| 6,915,431 B1 * | 7/2005 | Vasudevan | .......... | H04L 63/0428 709/203 |
| 7,293,289 B1 * | 11/2007 | Loc | .......... | H04W 12/12 726/22 |
| 8,964,990 B1 * | 2/2015 | Baer | .......... | H04L 63/062 380/277 |
| 9,191,298 B1 * | 11/2015 | Bilby | .......... | H04L 43/50 |
| 9,258,117 B1 * | 2/2016 | Roth | .......... | H04L 9/0861 |
| 2002/0099663 A1 * | 7/2002 | Yoshino | .......... | G06F 21/10 705/65 |
| 2002/0178271 A1 * | 11/2002 | Graham | .......... | G06F 21/6245 709/229 |
| 2005/0050322 A1 * | 3/2005 | Mizrah | .......... | H04L 9/0822 713/168 |
| 2005/0120203 A1 * | 6/2005 | Yeh | .......... | H04L 63/062 713/156 |

(Continued)

FOREIGN PATENT DOCUMENTS

| AU | WO 2014144601 A1 * | 9/2014 | .......... | H04L 63/061 |
|---|---|---|---|---|
| CN | 1494252 A * | 5/2004 | | |

*Primary Examiner* — Jason C Chiang
(74) *Attorney, Agent, or Firm* — DLA Piper LLP US

(57) ABSTRACT

Systems, methods, and non-transitory computer-readable storage media for rotating security keys for an online synchronized content management system client. A client having a first security key as an active security key may send a request to a server for a new security key as a replacement for the first security key. The server may receive the request and generate a candidate security key. The server can issue the candidate security key to the client device. After receiving the candidate security key, the client may send a key receipt confirmation message to the server. In response to the confirmation message, the server may mark the candidate key as the new security key for the client and discard the client's old security key. The server may send an acknowledgment message to the client device. In response, the client may also mark the candidate key as its new active key.

17 Claims, 9 Drawing Sheets

(56) References Cited

U.S. PATENT DOCUMENTS

| | | | |
|---|---|---|---|
| 2008/0178269 A1* | 7/2008 | Kim | H04W 12/06 726/4 |
| 2008/0279387 A1* | 11/2008 | Gassoway | H04L 9/0825 380/279 |
| 2009/0235338 A1* | 9/2009 | Sheehan | H04L 9/0891 726/5 |
| 2009/0262937 A1* | 10/2009 | Hirth | H04L 9/12 380/256 |
| 2009/0328186 A1* | 12/2009 | Pollutro | G06F 21/31 726/13 |
| 2012/0311609 A1* | 12/2012 | Taylor | G06F 8/20 719/313 |
| 2012/0331293 A1* | 12/2012 | Ma | H04L 9/0891 713/168 |
| 2013/0067552 A1* | 3/2013 | Hawkes | H04L 63/166 726/7 |
| 2014/0082360 A1* | 3/2014 | Laitinen | H04L 63/0428 713/168 |
| 2014/0273973 A1* | 9/2014 | Jeon | H04W 12/04 455/411 |
| 2014/0317409 A1* | 10/2014 | Bartok | H04L 63/06 713/171 |

* cited by examiner

SYSTEM AND METHOD FOR ROTATING CLIENT SECURITY KEYS

TECHNICAL FIELD

The present technology pertains to online synchronized content management systems, and more specifically pertains to a technique for rotating security keys for client devices.

BACKGROUND

Many online services rely on user credentials, such as a username and password, to authenticate a user or her client application. For example, a user trying to use an online synchronized content management system, such as Dropbox™ from Dropbox Inc. of San Francisco, Calif., may be asked to input her username and password into her web browser or her local client application before she can access content on the content management system's server.

In other instances, however, an online service may generate and issue a security key—a large randomly generated value that is computationally difficult to guess—to the client so that the client can later authenticate itself to the server with the key. This can simplify the user authentication process because the client does not have to ask the user to input her credentials each time the client attempts to communicate with the server. The security key can be transferred from the server to the client and stored inside the client device, such as in the form of a session cookie or a file saved in a secure location.

However, if the security key falls into the wrong hands, it can allow a malicious attacker to access the content belonging to the user account associated with the security key. For example, Brian may have installed a client application for an online synchronized content management service on his laptop computer. After Brian logs into the client application with his correct username and password, the application downloads a unique security key from the content management service's server. Brian can now use the application without having to enter the credentials every time because the client application can authenticate and communicate with the server using the security key. However, Brian, while using his laptop at a coffee shop, meets Susan, who asks Brian if she can borrow his laptop for a few minutes to browse the Internet. Unbeknownst to Brian, Susan is a malicious hacker who proceeds to steal Brian's security key by locating the file containing the key and copying the file on to her portable storage device. Using the stolen security key, Susan may be able to impersonate Brian and successfully access, from her own computer, his online files and folders on the content management service's server. Susan may not be required by the server to enter Brian's user credentials because she is in possession of Brian's security key.

In other instances, a security key can be compromised when a user device is lost or stolen. If the misplaced device contains a security key in its storage, then the security key can be exposed to a malicious user and similarly exploited. Thus, what is needed is a way for the online content management system and its client application to minimize the harm that can be caused by misuse of the security key.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for securely rotating keys between clients and servers. An online synchronized content management system may be run by one or more servers. Client applications installed on client devices can communicate with the servers to access content stored in the content management system. Each client application or device may be assigned a unique security key that can be used to authenticate and communicate with a server. A client device may send a request to the server for a new security key as a replacement for the current active security key. The server may receive the request and generate a candidate security key. The server can then issue the candidate security key to the client device. After receiving the candidate security key, the client can send a key receipt confirmation message to the server. The server may now mark the candidate key as the new security key for the client and discard the client's old security key. The server can then send an acknowledgment message to the client device. In response, the client may also mark the candidate key as its new active key and retire the old key.

The key rotation may be mandated by the server or it can be initiated by the client. In the former case, the server may notify the client that the client's current security key has expired or is about to expire. This notification may have been triggered by a normal operation request from the client and the server determining at that point that the key needs renewal. For key rotations initiated by the client, the client may have an internal timer that triggers key rotation on a fixed or dynamic time schedule.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Figure 1:
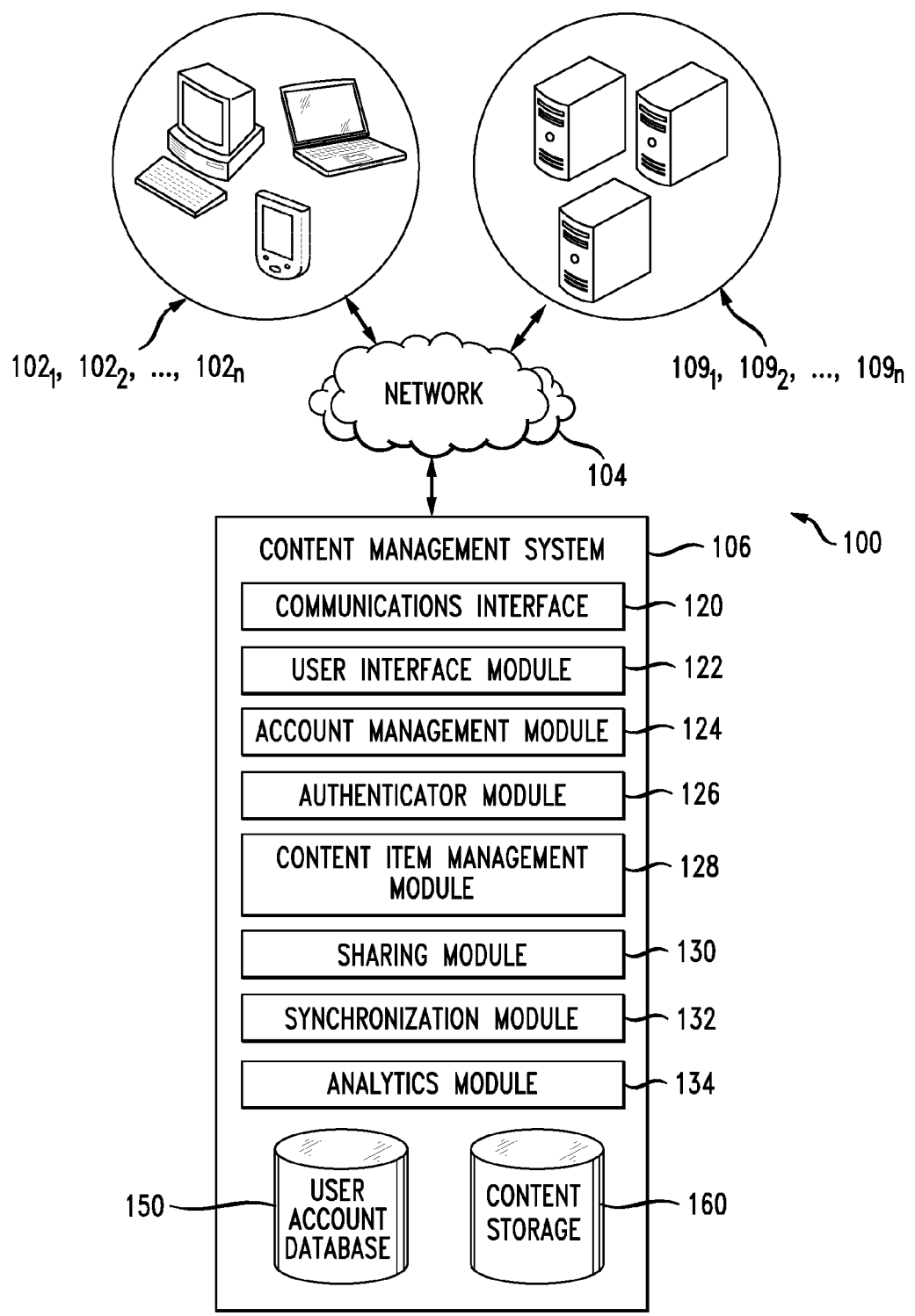
FIG. 1 shows an exemplary content management system configured to communicate with other devices via a network.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for securely and periodically distributing secret keys from a server to client devices. The term "client application" as used herein may refer to a piece of executable code that may reside on a client device for the purpose of accessing user content on the server and/or synchronizing user content between the client device and the server. A client application may also be called client software, a client-side application or a desktop client application (or simply a desktop client). Although a client application is typically a native application run on the client device's operating system, a client application can also be a general-purpose application such as a web browser. A client application may run in the background to constantly and automatically synchronize data between the client and the server with minimal or no input from the client's user. The client application may be configured to start automatically when the client device is switched on to provide constant access to the server, and to restart when the client device restarts.

The term "security key" as used herein may refer to a randomly generated value that is unique to a user account, an instance of a client application, or a client device. Thus, the security key may uniquely identify the associated user, client application, or client device. Security keys may also be referred to as secret keys, master keys, or device security keys. Security keys may be placed on the client device to allow the client to authenticate all of its operations conducted with the server. Although the term "security key" may refer to the key value itself, it may also refer to a file that contains the key value. Thus, the security key can be a text file, a binary file, a cookie, etc.

The term "active security key" or simply "active key" as used herein may refer to a security key that is associated with a client device or client application, and that is currently in use between the client and the server. The term "current security key" (or "current key") may be used interchangeably. This is in contrast to a "candidate security key" or simply "candidate key," which may be considered a candidate to become an active key if and when the client and the server agree to use it as the next active key and mark it as such.

The terms "old security key" and "new security key" (and their shortened forms "old key" and "new key") as used herein may be relative terms that are used to indicate whether a given security key, with respect to a key rotation, is the key being replaced or the key replacing the existing key. Thus, the active key before a key rotation can be considered an old key, and the active key after the key rotation can be considered a new key. Sometimes, a candidate key may also be referred to as a new key relative to the (currently) active key.

The term "key rotation" as used herein may refer to a process of replacing one security key for another. It may also be referred to as a key renewal, a key refresh, or a key exchange.

With respect to implementing various embodiments of the disclosed technology, an exemplary system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102") connected to network 104 by direct and/or indirect communication. Content management system 106 may be also called an online synchronized content management system, an online content management system, a file hosting service, a cloud storage service, a personal cloud service, etc. Online synchronized content system 106 can support connections from a variety of different client devices, such as desktop computers, mobile computers, mobile communications devices (e.g., mobile phones, smart phones, tablets), smart televisions, set-top boxes, and/or any other network enabled computing devices. Client devices 102 can be of varying type, capabilities, operating systems, etc. Furthermore, content management system 106 can concurrently accept connections from and interact with multiple client devices 102.

In general, network 104 is a geographically distributed collection of nodes interconnected by communication links and segments for transporting data between end nodes, such as personal computers and workstations, or other devices, such as sensors, etc. Network 104 can include a wide area network (WAN) and a public network, such as the Internet, but can also include a private or quasi-private network, such as an intranet, a home network, a virtual private network (VPN), a shared collaboration network between separate entities, etc. Indeed, the principles set forth herein can be applied to many types of networks, such as local area networks (LANs), virtual LANs (VLANs), corporate networks, wide area networks, and virtually any other form of suitable wired or wireless network.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include folders or other mechanisms of grouping content items together with different behaviors, such as collections, playlists, albums, etc. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1, 109_2, \ldots, 109_n$ (collectively "109") via an Application Programming Interface (API). Content management system 106 may receive a key renewal request, issue a candidate key, receive a key receipt confirmation message, send an acknowledgment message, etc. via communications interface 120. Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, security keys, API calls, specific client devices, and so forth, to ensure only authorized clients and users can access files. Authenticator module 126 may include a key generator sub-module that is capable of generating random numbers or alphanumeric strings that can be used as security keys. The key generator can be based on software, hardware, or combination of both. Authenticator module 126 may also store one or more security keys that are associated with various client devices. The security keys can be used to authenticate the client devices. Authenticator module 126 may also store one or more candidate security keys, which are generated by the key generator but not yet have been designated as an active security key for a client device. Furthermore, content management system 106 can include analytics module 134 that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible.

Figure 2A:
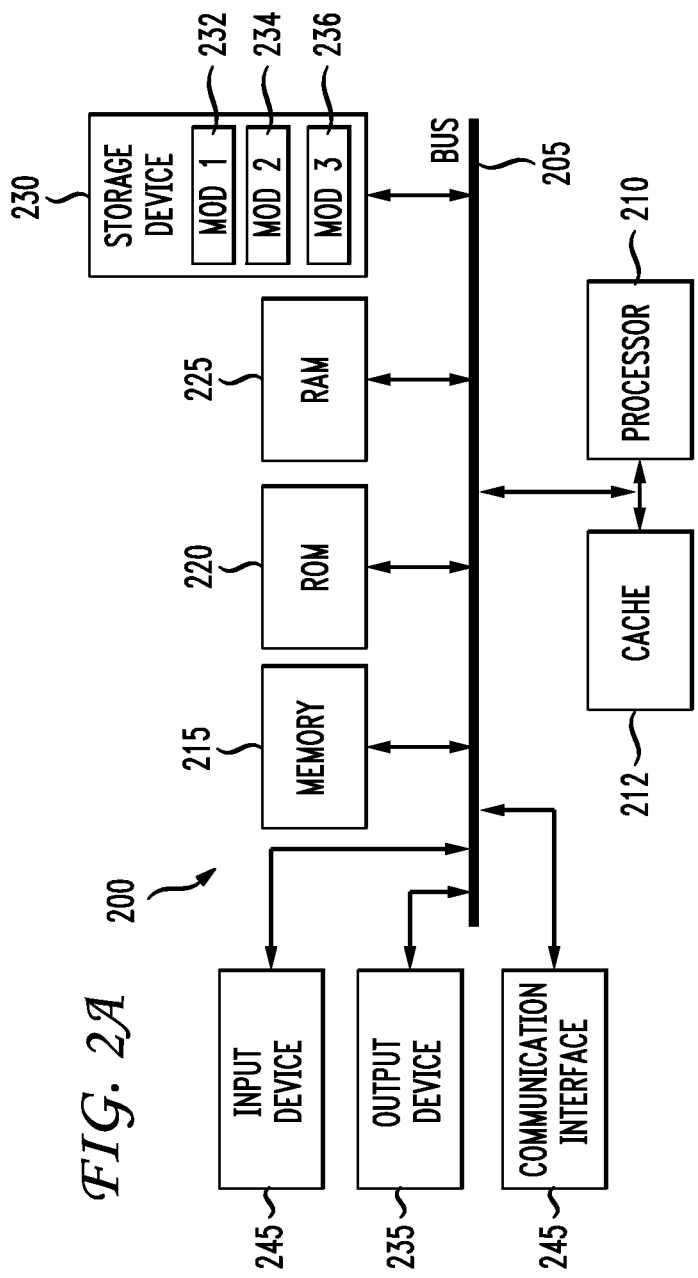
FIG. 2A shows the first exemplary system embodiment for implementing various embodiments of the present technology.
Figure 2B:
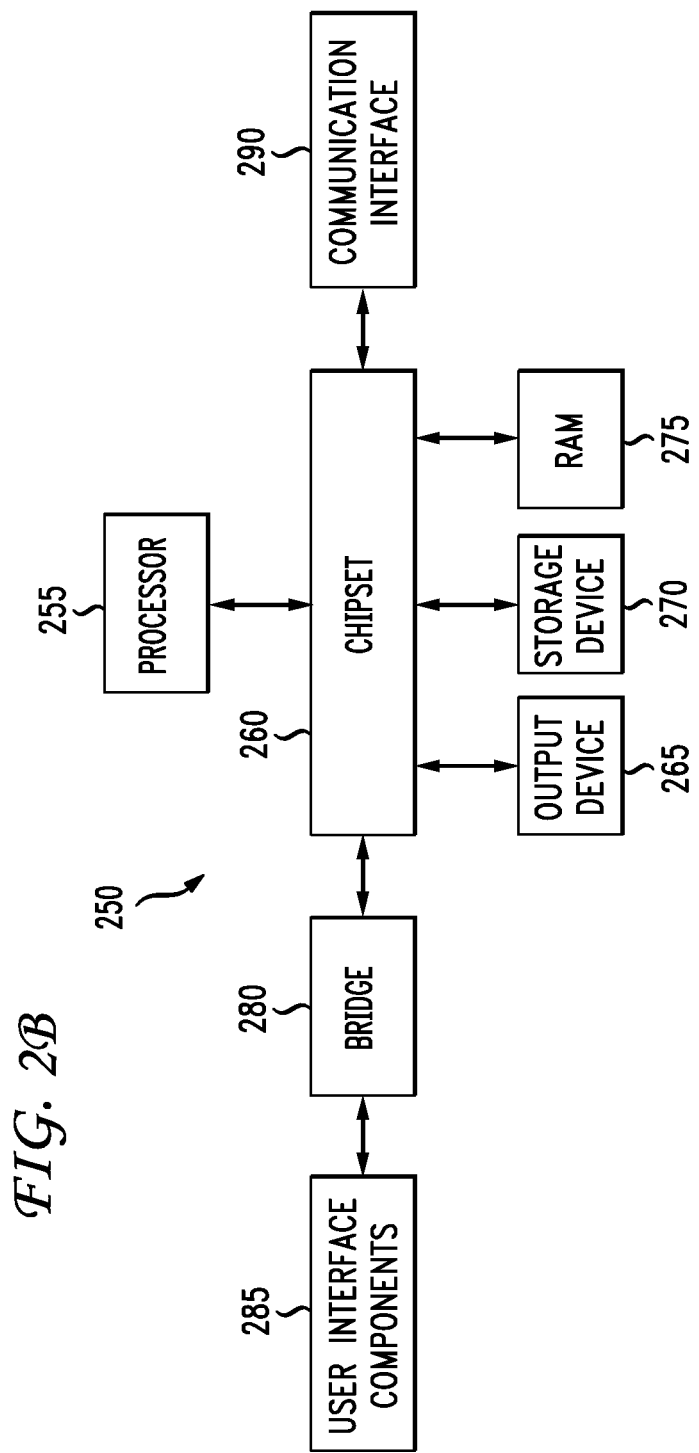
FIG. 2B shows the second exemplary system embodiment for implementing various embodiments of the present technology.

FIG. 2A and FIG. 2B show exemplary possible system embodiments. For example, content management system 106, client devices 102, and/or service providers 109, as shown in FIG. 1, may each be implemented as exemplary system 200 of FIG. 2A or exemplary system 250 of FIG. 2B. Moreover, client device 302, server 304, client 402, server 404, client 502, and server 504, as will be discussed later, may each be implemented as exemplary system 200 of FIG. 2A or exemplary system 250 of FIG. 2B. The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using a bus 205. Exemplary system 200 includes a processing unit (CPU or processor) 210 and a system bus 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 232, module 2 234, and module 3 236 stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

To enable user interaction with the computing device 200, an input device 245 can represent any number of input mechanisms, such as a microphone for speech, a touch-sensitive screen for gesture or graphical input, keyboard, mouse, motion input, speech and so forth. An output device 235 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, display 235, and so forth, to carry out the function.

FIG. 2B illustrates a computer system 250 having a chipset architecture that can be used in executing the described method and generating and displaying a graphical user interface (GUI). Computer system 250 is an example of computer hardware, software, and firmware that can be used to implement the disclosed technology. System 250 can include a processor 255, representative of any number of physically and/or logically distinct resources capable of executing software, firmware, and hardware configured to perform identified computations. Processor 255 can communicate with a chipset 260 that can control input to and output from processor 255. In this example, chipset 260 outputs information to output 265, such as a display, and can read and write information to storage device 270, which can include magnetic media, and solid state media, for example. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or 275. Further, the machine can receive inputs from a user via user interface components 285 and execute appropriate functions, such as browsing functions by interpreting these inputs using processor 255.

It can be appreciated that exemplary systems 200 and 250 can have more than one processor 210 or be part of a group or cluster of computing devices networked together to provide greater processing capability.

Figure 3:
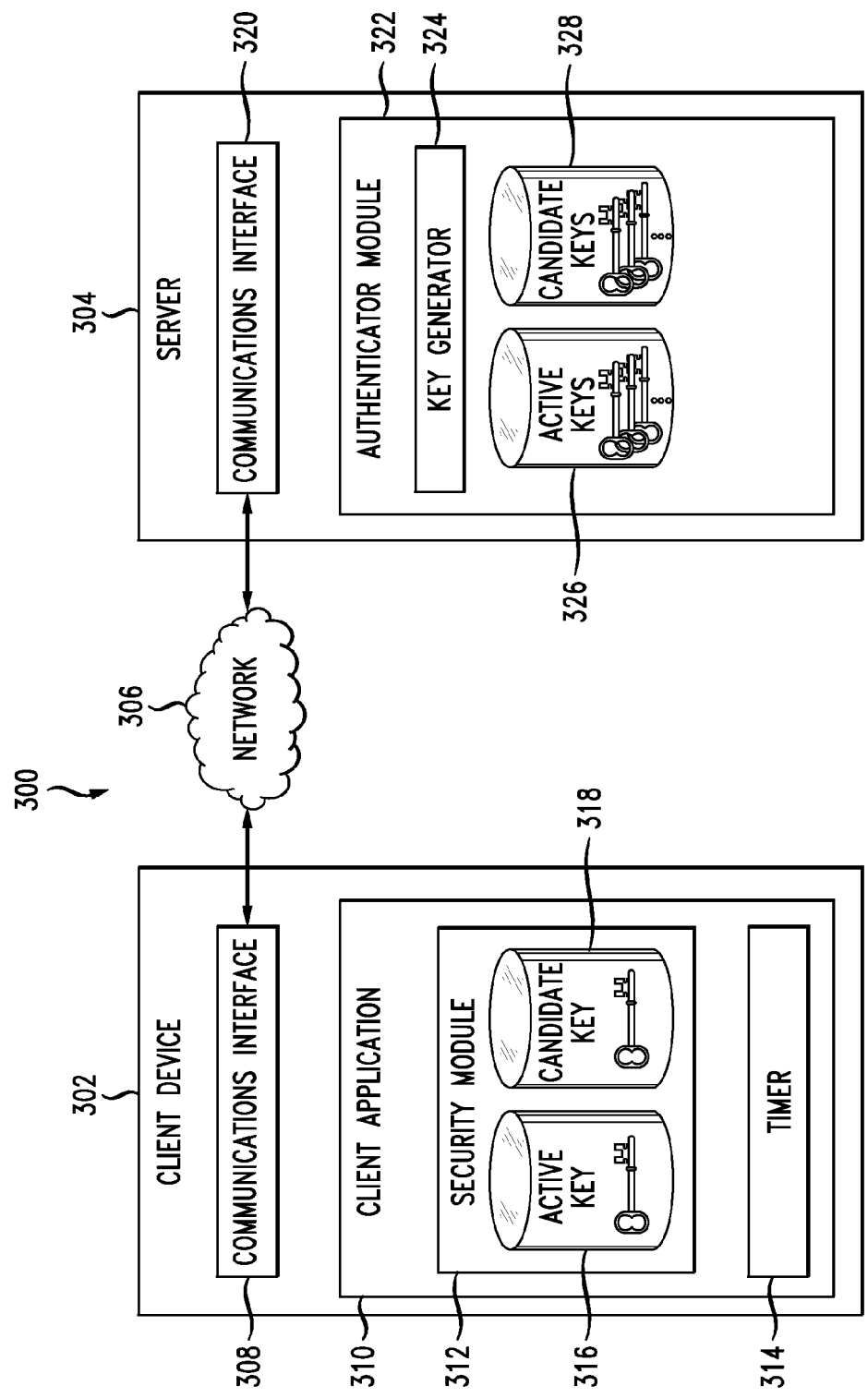
FIG. 3 shows exemplary client and server storing security keys.

FIG. 3 shows exemplary client and server storing security keys. In particular, in this exemplary communication session 300, client device 302 and server 304 may communicate with each other via network 306. Client device 302 can be, for example, one of client devices 102 as shown in FIG. 1. On the other hand, server 304 can be part of online synchronized content management system 106 of FIG. 1. Network 306 can be similar to network 104 as shown in FIG. 1. In other words, network 306 may range from local area networks (LANs) to wide area networks (WANs). LANs typically connect these nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, etc.

Client device 302 may be a user device, such as a computer, a mobile communications device, a smart television, a set-top box, or any other network-enabled computing device. Client device 302 may store thereon various types of user content (not shown in FIG. 3), such as digital data, documents, text files, video files, etc. in the forms of files and folders. Client-side application 310, installed on client device 302, can synchronize the content stored on client device 302 with server 304 so that duplicate copies of the user data may be maintained on server 304 and/or additional client devices (not shown in FIG. 3). Client device 302 may also be equipped with communications interface 308, such as a modem, a network interface controller (NIC), an Ethernet adapter, a Wi-Fi adapter, etc., that enables client device 302 to connect to network 306 and communicate with server 304 and/or other client devices. Client application 310 can interact with communications interface 308 to communicate with server 304 and synchronize content items. Client device 302 may include other software and/or hardware modules and components not shown in FIG. 3.

Client application 310 may include security module 312 and/or timer module 314. In some embodiments, however, security module 312 and/or timer module 314 may exist as a separate module from client application 310. Security module 312 of client device 302 can work in conjunction with server 304—especially authenticator module 322 of server 304—to ensure that client application's 310 access to server 304 is authorized. For example, security module 312 may provide user credentials, such as a username and password received via user input, to server 304 so that authenticator module 322 can authenticate the user account associated with client device 302. In some embodiments, server 304 may provide each client device 302 with a unique security key so that client application 310 need not provide user credentials each time it attempts to communicate with server 304 and/or synchronize data. The security key can be a randomly generated value that would be computationally difficult or impossible to guess. In some embodiments, the security key can be a private key that may be used to create digital signatures in asymmetric cryptography (also known as public key cryptography). In such embodiments, client device 302 may encrypt messages with the security key on a per-message basis before sending them out to server 304. Server 304 can then use a matching public key to decrypt the message and verify that the message comes from a legitimate source. In some other embodiments, the security key can be a symmetric key or a session key that is shared by both client device 302 and server 304. The session key may be used to encrypt all messages that are communicated between client 302 and server 304 during a communication session. Alternatively, the key can be included as part of the message sent from client 302 to server 304, and server 304 can authenticate client 302, or validate the identity of client 302, by verifying the key that was included in the message. For example, a secure channel, such as a Transport Layer Security (TLS) or Secure Socket Layer (SSL) channel, can be established between client302 and server 304 by using the security key. If a user account is associated with more than one client devices, such as when the user synchronizes her user data among two or more client devices, server 304 may generate and issue different security keys to the client devices so that each client device would have a unique security key. On the other hand, if more than one user account is associated with a single client device, server 304 may also generate and issue unique security keys for each of the user accounts on the device.

Security module 312 may store active security key 316 and candidate key 318, although the keys may be stored elsewhere on client device 302. Keys 316, 318 may be stored in a secure and/or obscure location inside client device 302 so that a malicious user who may gain access to client device 302 could not discover keys 316, 318 easily. Active key 316 is a security key that has been issued by server 304 and is currently being used by client application 310 for authentication with server 304. Meanwhile, candidate key 318 may have been issued by server 304 as a candidate for a new security key to replace active key 316, but has not been activated yet. The use of candidate keys may be necessary for synchronization of the key renewal process between client device 302 and server 304. Client application 310 can hold candidate key 318 until the key rotation process is successfully completed and then start using candidate 318 as the new active key. If, however, the key rotation process is not successful, then client application 310 may discard candidate key 318 and start the process all over again to receive a new candidate key.

Timer module 314 can allow client application 310 to periodically rotate security keys by keeping track of key rotation schedule(s) and signaling to client application 310 when active key 316 needs to be refreshed. Timer 314 can run on a predefined time schedule. For example, timer 314 may be set up so that client application 310 rotates its key(s) every 24 hours. Those of skill in the art will understand that the key rotation schedule may be based on other fixed time durations, such as 6 hours, 7 days, 1 month, etc. The key rotation schedule may also be dynamically adjusted rather than being based on fixed time schedules. For example, timer module 314 may adjust the key rotation interval depending on dynamic factors such as network traffic, overall security level, presence of malicious activities (e.g., hacking attempts detected), security policy change, user request, etc. In some embodiments, client device 302 may lack timer module 314. In such embodiments, key rotation can be initiated by server 304 rather than by client 302. Server 304 may transmit a key expiration notification message to client 302 to let client application 310 know that active key 316 is no longer valid (or will expire soon) so that client application 310 may start the key rotation process.

In a multi-user environment, client application 310 may store more than one active keys and/or candidate keys (not shown in FIG. 3). For example, client device 302, such as a desktop computer, can be used by more than one user, each of whom may have a separate user account on server 304. If the client device and/or the client application is configured to handle two or more user accounts, the user accounts may be each assigned a unique security key. Depending on which one of the multiple users is using client device 302 at the moment, client application 310 may use one of many active security keys that are stored inside client device 302 to authenticate or communicate with server 304. Accordingly, client application 310 can also record, for example in a database, associations between the user accounts and the active security keys in order to keep track of which security key is associated with which user account. The users may have to input correct user credentials to client application 310 before client application 310 is able to retrieve the appropriate active key for the user. Similarly, multiple candidate keys can be stored inside client device 302 at a given time so that key rotation can be performed on more than one security key at a time. Timer 314 can also keep track of multiple key expiration times for multiple user accounts.

Server 304 can communicate through communications interface 320 with client device 302 via network 306. Server 304 can be a content management system, such as content management system 106 of FIG. 1. Accordingly, communications interface 320 and authenticator module 322 may correspond to communications interface 120 and authenticator module 126 of FIG. 1. Although server 304 is shown in FIG. 3 to have only two modules 320, 322, those of ordinary skill in the art will recognize that server 304 can have other hardware and software modules, such as one or more of the exemplary modules for content management system 106 shown in FIG. 1.

Communications interface 320, such as a modem, a NIC, an Ethernet adapter, a Wi-Fi adapter, etc., enables server 304 to communicate with client device 302 and other client devices via network 306. Authenticator module 322 that resides in server 304 can verify user credentials, security tokens, security keys, API calls, client devices, etc. to ensure only authorized clients and users may communicate with server 304 and/or access content stored in server 304. Authenticator module 322 can communicate with communications interface 320 to reach network nodes outside server 304, such as client device 302. Authenticator module 322 may include one or more sub-modules or sub-components, such as key generator 324, active key storage 326, and candidate key storage 328. However, those of skill in the art will understand that each of these sub-modules may well exist outside authenticator module 322 or even outside server 304 as a module, component, or device independent from authenticator module 322 and/or server 304. Moreover, one or more of the sub-modules can be combined with one another. For example, in some configurations, active key storage 326 and candidate key storage 328 may reside inside one single physical storage device or a group of physical storage devices. These physical storage device(s) may also be consolidated with user account database 150 and/or content storage 160, as shown in FIG. 1.

Key generator sub-module 324 may be a software or hardware module that can randomly generate values, such as numbers and alphanumeric strings. For example, key generator 324 can be configured to generate random 128-bit hexadecimal numbers that are unique from each other. In some embodiments, key generator 324 can generate asymmetric private-public key pairs. In other embodiments, key generator 324 can generate symmetric keys such as session keys. Once generated, these security keys may be first treated as a candidate key until it is agreed between client 302 and server 304 that the key would become the next active security key. Otherwise, the candidate key can be discarded before ever becoming an active key.

Any security keys that have been generated by key generator module 324 may be placed in active key storage 326 and/or candidate key storage 328. Although active key storage 326 and candidate key storage 328 are shown as two separate storage areas in FIG. 3, those of skill in the art will understand that active keys and candidate keys can be stored together. When active keys and candidate keys are stored in the same logical or physical location, authenticator module 322 can distinguish between the two types of keys by maintaining flags, attributes, mapping tables, etc. to mark which keys are key candidates and which keys are active. For example, a security key may have an "active status" attribute that can be set to either 1 (i.e., "true") or 0 (i.e., "false"). Authenticator module 322 can then mark a candidate key as an active key by simply flipping the attribute value from 0 to 1.

Active key storage 326 may store more than one active security keys at a time. As an example, server 304 may be serving content to more than one client devices. As such, server 304 can generate multiple security keys, one key for each client device. Similarly, multiple candidate keys can be managed by server 304 when performing key rotation for multiple client devices.

In some aspects, server 304 may generate hash values of active keys and candidate keys and store those hashes instead of storing the actual key values. Server 304 can later use the hash values to verify client device's 302 security key(s). Avoiding to store the key values in server 304 can reduce the risk of keys being leaked or stolen because even if a malicious attacker compromises server 304, the attacker cannot obtain the key values.

Figure 4:
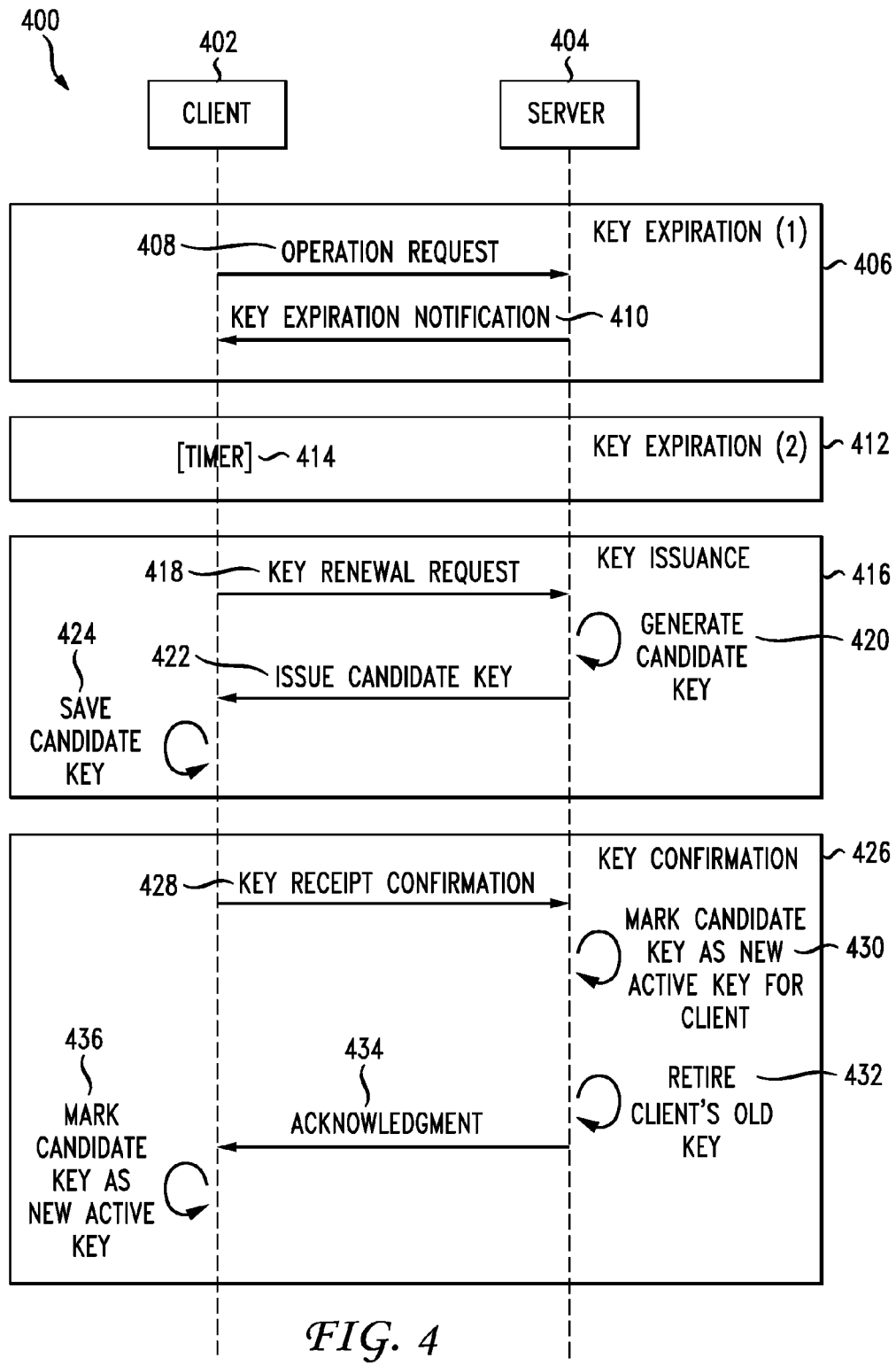
FIG. 4 shows a first sequence diagram for an exemplary key rotation protocol.

FIG. 4 shows a first sequence diagram for an exemplary key rotation protocol. In this example key rotation protocol 400, client 402 and server 404 exchange various messages in order to replace the client's active security key with a new key. Client 402 can be client device 302 or client application 310 as shown in FIG. 3. Similarly, server 404 can be server 304 of FIG. 3. Client 402 and server 404 may exchange messages via a network, such as network 306 shown in FIG. 3. Each message exchanged between client 402 and server 404 may include a security key, especially the currently active security key assigned for client 402 as agreed upon by client 402 and server 404. In the alternative, each message can be encrypted with the security key. Key rotation protocol 400 can be broken down into various phases, such as key expiration 406, 412; key issuance 416; and key confirmation 426. It is to be noted, however, that key rotation protocol 400 is only one example protocol that may be used for key rotation, and other protocols or variations to protocol 400 may be used. Moreover, the sequence of message exchanges illustrated in FIG. 4 can be altered, and one or more messages can be omitted.

At the outset, client 402 may already have an active security key that has been issued by server 404. The security key may have been issued when the client application was first installed on the client device. Alternatively, the security key may have been renewed after the initial installation. The security key can be stored in client 402. Server 404 may also have stored inside it the identical security key (in symmetric cryptography) or a matching key (in asymmetric cryptography), such as a matching public key that can be used to verify the security key for client 402. Alternatively, server 404 may be storing a hash value of client's 402 security key. Although the hash value would be different from the security key, server 404 can nevertheless use the hash to verify the security key.

Before key issuance phase 416, optional key expiration phase(s) may be introduced to initiate the key rotation process. There can be at least two ways in which a security key may be invalidated (i.e., security key expires): invalidation by server 404 (406) and invalidation by client 402 (412). In the first key expiration method 406, client 402 may not be aware of the key expiration until it is notified by server 404. Thus, in this expiration method, the key rotation process is mandated and/or initiated by server 404. In this key expiration method 406, client 402 may send operation request 408 to server 404. Operation request 408 may be a normal operation request that is unrelated to key rotation. For example, operation request 408 can be a request to authenticate user, synchronize data, update information, etc. Operation request 408 may include the current security key of client 402. Alternatively, operation request 408 can be encrypted with the current security key.

After receiving operation request 408, server 404 may determine that the current active key for client 402 needs renewal. Server 404 may determine this based on a predetermined key renewal schedule. For example, if the security policy for server 404 dictates that every security key needs to be rotated every 24 hours, then server 404 can check whether the key needs to be renewed, every time server 404 receives operation request 408 or any other message from client 402, by looking up when the security key for client 402 was last issued and determining whether 24 hours have passed since the time of key issuance. Server 404 can also dynamically adjust the key renewal schedule for each client that it serves. For example, server 404 can prematurely retire a security key when it detects a security threat. In another example, server 404 may experience a particularly heavy load of requests from various client devices and decide to put off renewing keys for some clients. Once server 404 determines that client 402 needs a key renewal, server 404 can transmit key expiration notification message 410 to client 402. Key expiration notification 410 is designed to put client 402 on notice of expiration or impending expiration of client's 402 currently active security key. In some embodiments, server 404 may send key expiration notification 410 to client 402 without receiving operation request 408 first. For example, server 404 may have a timer that triggers transmission of key expiration notification message 410 to client 402 at predefined time intervals. Key expiration notification 410 may contain such additional information as expiration time. Key expiration notification message 410 can also include client update information in case client 402 runs a legacy client application that does not yet support key rotation protocol 400. The client update information can help client 402 get updated to a newer version of the application that supports the key rotation feature.

In lieu of or in conjunction with the first key expiration method 406, the second key expiration method 412 may be also used. The second key expiration method 412 involves a client-initiated key rotation process, in which client 402 determines for itself that its current security has expired or is about to expire, and that the key needs renewal from server 404. Client 402 may accomplish this with a help of timer 414, such as timer module 314 shown in FIG. 3. Timer 414 may run on predefined renewal schedule(s) for the client's security key and inform client 402 when the security key needs to be rotated. For example, timer 414 can trigger a key rotation every hour, every 12 hours, every 24 hours, every week, every month, etc. Moreover, timer 414 can be configured to dynamically adjust the renewal schedule depending on factors such as network traffic, server workload, presence of security threats, security policy change, etc.

Once client 402 determines, either by itself or after getting notified by server 404, a key rotation is needed, it can enter key issuance phase 416. The messages exchanged in key issuance phase 416 may be encrypted. For example, a secure SSL channel encrypted with the current active security key can be established between client 402 and server 404. In this phase, client 402 may first transmit key renewal request 418 to server 404. Request 418 informs server 404 that client 402 is ready to receive a new security key and retire its old key. After server 404 receives key renewal request message 418, server 404 can generate a candidate key (420). The candidate key can be a randomly generated value. Candidate keys can be uniquely generated each time so that no two candidates would ever be the same. Candidate keys are security keys that may potentially become an active key for client 402. Server 404 can store the newly generated candidate inside server 404 until it is determined whether the candidate key would become the active key for client 402 or be discarded. Server 404 can also generate a hash value of the candidate key and store the hash inside server 404. Server 404 may then issue the generated candidate key to client 402 by transmitting the key value to client 402 (422). Encryption of the candidate key issuance message, for example by client's 402 active key, can ensure that the candidate key is delivered only to the key renewal requester. This can be accomplished by using the previously established secure SSL channel. If server 404 had generated and stored a hash value of the candidate key, server 404 may retain the hash value but destroy the candidate key now to reduce the risk of stolen keys. Once the candidate key is received, client 402 can store the newly generated candidate key in its storage until the key is confirmed (424).

In key confirmation phase 426, client 402 can send key receipt confirmation message 428 to server 404. Key receipt confirmation 428 signifies to server 404 that client 402 has successfully received the candidate key. Client 402 may include the newly received candidate key in key receipt confirmation message 428 in order to prove to server 404 that the new key was indeed received by client 402. Alternatively, key receipt confirmation message 428 can be encrypted or encoded with the candidate key. In some embodiments, key receipt confirmation message 428 can be doubly encrypted with both the currently active key (i.e., old key) and the candidate key (i.e., new key) to prove to server 404 that message 428 originates from a trusted source (i.e., client 402) and that the trusted source is now in possession of the newly issued security key. When server 404 receives key receipt confirmation 428, it can verify client's 402 claim by examining message 428. In particular, server 404 can check to see if confirmation message 428 contains the candidate key and that it matches the one stored in server 404. Alternatively, server 404 can verify whether confirmation message 428 was encrypted with the candidate key. In some embodiments where the protocol specifies that confirmation message 428 be doubly encrypted, server 404 may determine that confirmation message 428 was encrypted both with the old key and the new key. If server 404 had generated and stored a hash value of the candidate key, then server 404 can now use the hash value to verify message 428. Server 404 may retrieve the candidate key that it has stored previously (420) to compare the key values. If server 404 determines that key receipt confirmation 428 does not contain the candidate key or that key receipt confirmation 428 was not encrypted with the candidate key, then server 404 may terminate the key rotation process. In some embodiments, however, server 404 can send a message to client 402 notifying that the key does not match. In some other embodiments, server 404 may resend the same candidate key back to client 402. In yet some other embodiments, server 404 may create another candidate key different from the previously generated candidate key and issue the new candidate key to client 402. Server 404 may also take a combination of two or more of these actions.

If, however, server 404 determines that client 402 is indeed in possession of the correct candidate key, server 404 can mark the candidate security key that it is storing as the new active key with regards to client 402 (430). Server 404 can accomplish this by changing the active status flag/attribute/indicator of the candidate security key. For example, server 404 can change the active flag value of the candidate security key from 0 ("false") to 1 ("true"). In another example, server 404 can change the candidate status attribute of the security key from 1 ("true") to 0 ("false"). In yet another example, server 404 can move the security key from the candidate key storage area to the active key storage area. Now that server 404 has associated a new security key with client 402, server 404 may communicate with client 402 from this point on using the new security key exclusively. Thus, once the new active key (i.e., previously candidate key) is marked as being active, server 404 may safely retire the client's old security key (432). Server 404 can retire the old key by deleting the key value or severing the link between the key value and client 402. Alternatively, retiring the old key may be performed prior to marking the candidate key as new active key. In some embodiments, a security key may never be reused once it is retired.

In some configurations, once the old key is retired, a client device may not be allowed to request another key renewal using the retired key. In other words, each security key may be allowed exactly one key renewal. This renewal policy can minimize the chance that a malicious actor might prolong her unauthorized access by continuing to rotate her own stolen key. For example, let us assume that client 402 had security key 1 as its active security key, which was inadvertently leaked to a malicious third party at 8:00 PM one evening. Server 404 may mandate that all its clients' security keys be renewed every 24 hours at midnight every night. Client 402 may receive key expiration notification 410 at 12:00 AM that night and go through key issuance phase 416 and key confirmation phase 426 to obtain security key 2 as its new active security key. Both client 402 and server 404 have retired security key 1 by the end of key confirmation phase 426. When the malicious third party attempts to renew security key 1 via her own client device or application by sending a key renewal request to server 404, server 404 can simply disregard this request because security key 1 had already been refreshed for client 402 by server 404. Thus, in this example, the malicious third party's unauthorized access to server 404 using the stolen security key lasted only for a limited time (i.e., 4 hours). Optionally, server 404 may send a warning message to client 402 to let the user know that there had been a potentially malicious attempt to intercept the security key by a rogue client device.

If, however, the malicious third party somehow beats client 402 to the punch and manages to send a key renewal request to server 404 before client 402 does, server 404 may send out a notification message to the user account associated with client 402 through an alternative channel in order to warn of a potentially suspicious activity. This notification message can be sent out only when server 404 determines that there is enough suspicion that an illicit activity may be going on, such as when server 404 suddenly gets a key renewal request from an unfamiliar client device. For example, when the malicious third party manages to reach server 404 to refresh the key, server 404 may detect that the request is sent from a device that server 404 does not recognize. Server 404 may attempt to reach the user associated with client 402 by an alternative means, such as email, text message, telephone, online chat, mail, etc. to notify the user that the key was renewed by an unrecognized device. In some embodiments, the notification can be delivered directly to the client application belonging to client 402. For example, when client 402 attempts key renewal by sending key renewal request 418 to server 404, instead of issuing a candidate key (422), server 404 can send a notification message to client 402 indicating that security key 1 has been already renewed by another client device and requesting to the user to verify the renewal and/or report any suspicious activity. Once the user finds out about the potential foul play, he can contact the online content management service to reinstate his client device into the loop by obtaining yet another security key and invalidating the malicious third party's new security key. The user may be asked to provide his user credentials to verify that he is the authorized user. Alternatively, the warning message may be sent out to the user after the illicit renewal request is received but before actually renewing the key. The key can then be rotated only after the user personally authorizes the key renewal. The authorization may be accompanied with a request to provide user credentials to prove that the key rotation request comes from the legitimate user. In addition, the malicious third party's client application can be asked to provide user credentials as well. By implementing some of the mechanisms described above, server 404 can prevent malicious actors from stealing security keys and obtaining unauthorized access for an extended period of time.

Server 404 may send acknowledgment ("ACK") message 434 to client 402 to inform client 402 that the candidate key is now activated in server 404 and that client 402 is expected to use the candidate key as the new active key from that point on. Server 404 may encrypt or encode ACK message 434 with the new active key (i.e., previously candidate key). Alternatively, server 404 can include the new active key in ACK message 434. After receiving ACK message 434 and/or verifying that message 434 contains the candidate key, client 402 may then mark the candidate key, which client 402 has stored in a previous step (424), as its new active key (436). Client 402 may now communicate and/or authenticate with server 404 using the newly activated key. Client 402 may also retire the old security key after receiving ACK 434 by discarding the old key value. After one round of key rotation process 400 is complete, client 402 and server 404 may communicate with each other using the newly issued key until, once again, client 402 receives key expiration notification message 410 from server 404 and/or timer 414 expires and notifies client 402. Key issuance phase 416 and key confirmation phase 426 may then be repeated to complete another cycle of key rotation.

Figure 5:
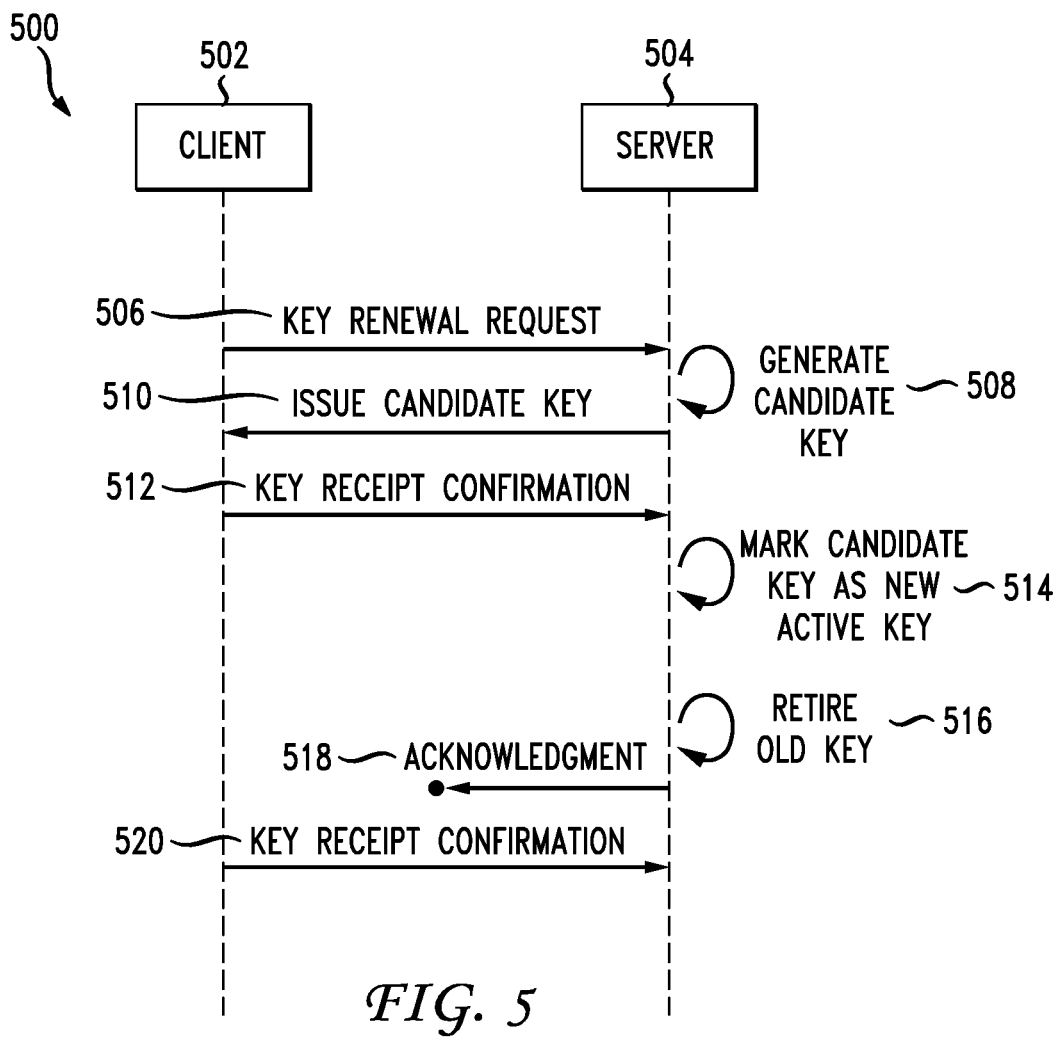
FIG. 5 shows a second sequence diagram for the exemplary key rotation protocol.

FIG. 5 shows a second sequence diagram for the exemplary key rotation protocol. Specifically, FIG. 5 shows an exemplary exception handling scenario 500 for exemplary key rotation protocol 400. After client 502 transmits exchange key renewal request message 506 to server 504; server 504 generates a candidate key (508); and server 504 issues the candidate key to client 502 (510) in a similar manner to key issuance phase 416 of FIG. 4, server 504 may proceed to mark the candidate key as the new active key for client 502 (514), and retire client's 502 old security key (516) in a similar manner to the key confirmation phase 426 of FIG. 4. However, when server 504 sends out ACK message 518 that is destined for client 502, ACK message 518 can get lost mid-transmission and never reach its intended destination, client 502, in time. Under such an exceptional circumstance, client 502 may send another key receipt confirmation message 520 to server 504 in order to elicit another ACK message from server 504. In some embodiments, key receipt confirmation message 520 can be identical to key receipt confirmation message 512. In other embodiments, key receipt confirmation message 520 may include additional information such as the number of retries. The repeat key receipt confirmation messages can be sent out to server 504 when a predetermined period of time (i.e., wait time) elapses after the previous confirmation is sent out and client 502 fails to receive ACK 518. When server 504 receives the second key receipt confirmation message 520, server 504 can simply retransmit ACK 518 without issuing another candidate key.

In some embodiments, if client 502 fails to receive ACK 518 from server 504 even after repeated attempts to send confirmation messages, for example after a predefined number of confirmation messages are sent out without success, the entire key renewal process may be considered a failure and client 502 may have to reinitiate the whole process by sending out a fresh key renewal request. In such a case, server 504 may discard the previously issued candidate key and generate a new candidate key.

Figure 6:
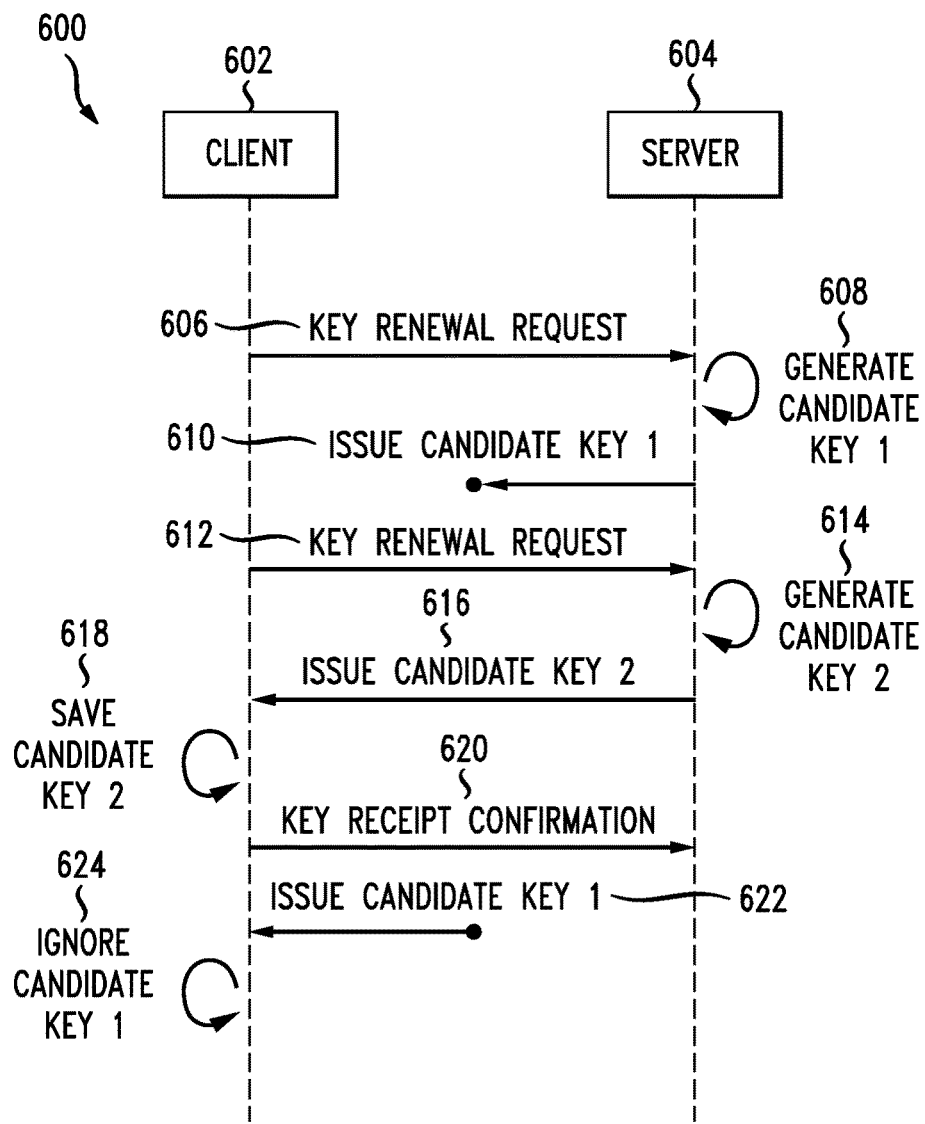
FIG. 6 shows a third sequence diagram for the exemplary key rotation protocol.

FIG. 6 shows a third sequence diagram for the exemplary key rotation protocol. Specifically, FIG. 6 shows another exemplary exception handling scenario 600 for exemplary key rotation protocol 400. When client 602 transmits key renewal request message 606 to server 604, in a similar manner to key renewal request message 418 of FIG. 4, server 604 can generate a candidate key (608) and transmit the first candidate key back to client 602 (610). However, the first candidate key may get lost in transit or its transmission may be delayed because of, for example, poor network conditions. Client 602 may never receive the first candidate key or fail to receive the key within the predefined waiting time (e.g., 10 seconds).

In such an exceptional case, client 602 can reinitiate the key rotation process by sending another key renewal request 612 to server 604. Client 602 may continue to send out key renewal requests, for example up to a predefined number of times, until client 602 receives a candidate key from server 604. Server 604, after receiving the repeat request 612, can simply retransmit the first candidate key back to client 602. However, in some embodiments, server 604 can generate another candidate key (614). The first candidate key previously generated in step 608 may now be discarded. Generating a new candidate key each time server 604 receives a renewal request can help increasing security of the protocol and bolstering key integrity by ensuring that every security key is issued to one client device only and that no security key is reused. It may also decrease the risk of a key leak because key retransmissions would be limited.

Server 604 can then issue the second candidate key to client 602 (616). Client 602 can receive the second candidate key and store the received key as the candidate key (618). Client 602 may then send key receipt confirmation message 620 to server 604 to continue on with key confirmation phase 426 as shown in FIG. 4. Client 602 may include the second candidate key in confirmation message 620 prior to sending the message out. Alternatively, confirmation message 620 can be encrypted with the second candidate key. Message 620 can also be doubly encrypted with the active key and the second candidate key. However, prior to or after confirmation message 620 is sent out but after the second candidate key is received by client 602 (616), the first candidate key previously issued in step 610 may mysteriously rematerialize from the network and belatedly reach client 602 (622). Alternatively, the first candidate key might have gotten delayed, for example because of adverse network conditions, but may nevertheless manage to reach its destination, client 602, after the second candidate key had already reached client 602. In such a scenario, client 602 may safely ignore the first candidate key and not respond to it. In other words, client 602 can be configured to only store and respond to the candidate key that it receives first and disregard any subsequent delivery of candidate key(s). Server 604 can also be configured to ignore any key receipt confirmation messages that may contain or have been encrypted with the first candidate key, which has been already discarded by server 604.

Figure 7:
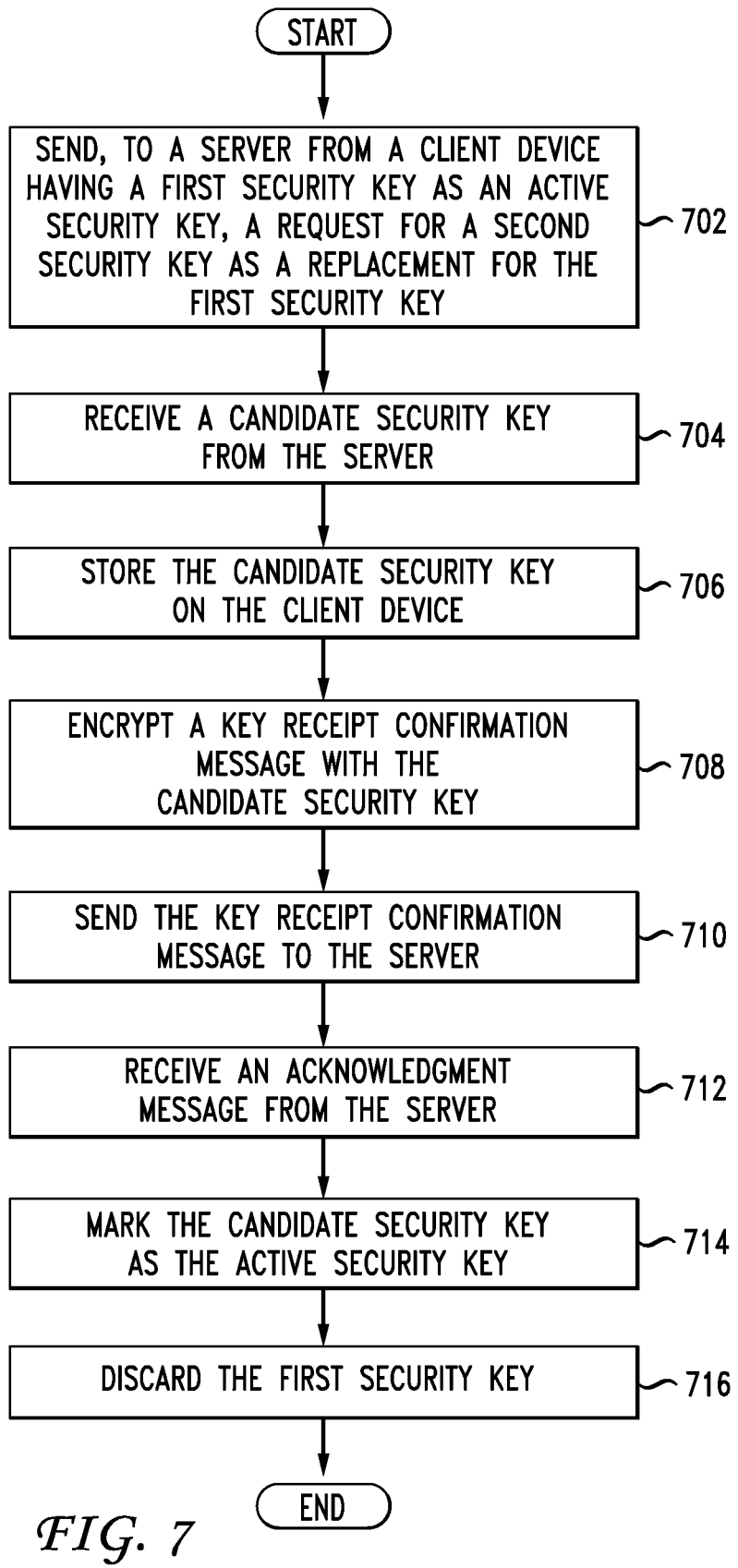
FIG. 7 shows an exemplary method embodiment.
Figure 8:
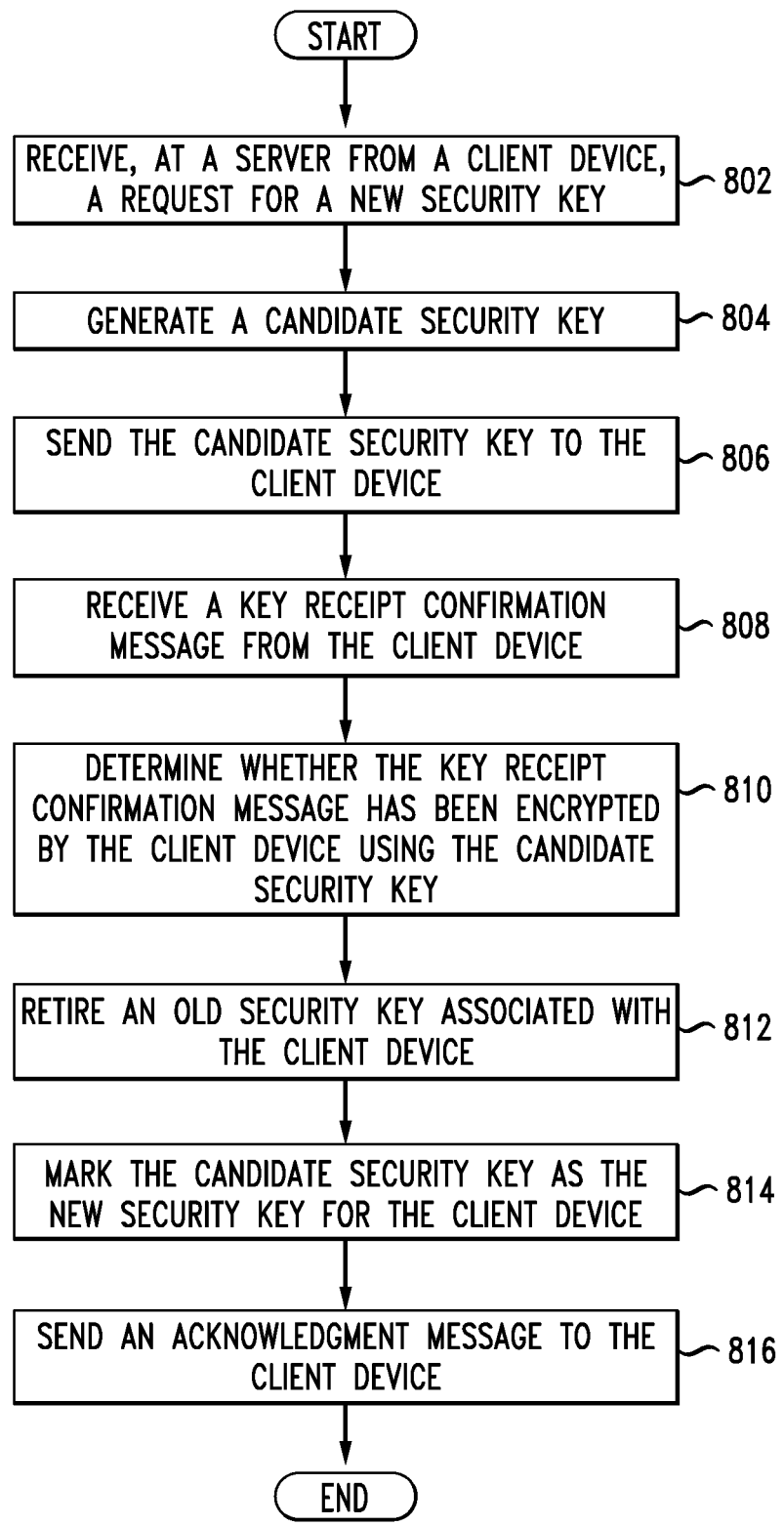
FIG. 8 shows another exemplary method embodiment.

Having disclosed some basic system components and concepts, the disclosure now turns to the example method embodiments shown in FIGS. 7-8. For the sake of clarity, the methods are described in terms of system 200, as shown in FIG. 2A, configured to practice the method. Alternatively, however, the methods may also be practiced by client device 102i, service provider 109i, or online content management system 106, as shown in FIG. 1; system 250 as shown in FIG. 2B; or client device 302, client application 310, or server 304, as shown in FIG. 3. The steps outlined herein are exemplary and can be implemented in any combination thereof in any order, including combinations that exclude, add, or modify certain steps.

FIG. 7 shows an exemplary method embodiment. First, system 200 may send, to a server from a client device having a first security key as an active security key, a request for a second security key as a replacement for the first security key (702). The request can be a renewal request. Here, system 200 can be the client device and the server can be an online synchronized content management system. Moreover, any communication between the client device and the server can contain the active security key is a method of authentication. In some embodiments, the messages can be encrypted with the active security key. The communication may include synchronizing a content item between the client device and the server. The communication may also include authentication of the client device by the server. Prior to sending the request to the server, system 200 can send, from the client device to the server, an operation request containing, encrypted with, or associated with the first security key. Then, also prior to sending the request, system 200 can receive a message from the server, the message indicating that the first security key has expired. Alternatively, sending the request can be triggered by a timer in the client device, the timer periodically triggering the client device to renew the active security key.

System 200 may receive a candidate security key from the server (704). System 200 may then store the candidate security key on the client device (706). System 200 may encrypt a key receipt confirmation message with the candidate security key (708). The key receipt confirmation message can also be doubly encrypted with the first security key (i.e., current active security of the client device). In some embodiments, however, system 200 may embed the candidate security key in the key receipt confirmation message prior to sending the key receipt confirmation message to the server, without necessarily encrypting the message with the candidate key. System 20 may embed both the candidate key and the first security key in the key receipt confirmation message. System 200 may then send the key receipt confirmation message to the server (710). In response, the server can send an acknowledgment message. System 200 may receive the acknowledgment message from the server (712). After the receipt of the acknowledgement message, system 200 may mark the candidate security key as the active security key (714). In other words, system 200 may renew the active security key by replacing the first key with a second key (i.e., candidate key). Once the first security key becomes obsolete, system 200 may discard the first security key (716).

In certain situations, for example, after receiving the candidate security key, system 200 may receive an additional candidate security key from the server. System 200 may then discard the additional candidate without sending an additional key receipt confirmation message to the server. In some other situations, for example, when a predetermined time period elapses after sending the key receipt confirmation message without receiving the acknowledgment message, system 200 may resend the key receipt confirmation message to the server.

FIG. 8 shows another exemplary method embodiment. First, system 200 may receive, at a server from a client device, a request for a new security key (802). In this exemplary embodiment, system 200 can be the server. System 200 also can be an online synchronized content management system. Prior to receiving the request, however, system 200 may have received, at the server from the client device, an operation request containing, encrypted with, or associated with an expired security key. The expiration of the key could have been determined by the server after receiving the operation request. System 200 could have then sent an expired security key notification to the client device, and denied the client device any further service until the request for the new security key is received from the client device.

After the request for the new security key is received at the server, system 200 may generate a candidate security key (804). The candidate security key can be generated in response to a key renewal request from the client device. The candidate security key can be a randomly generated value, such as a hexadecimal string, that is unique to the client device. In a multi-user environment, one candidate security key can be generated per user account per client device. For example, if Alice and Bob, each having a separate user account with a content management system, share two client devices—a laptop computer and a tablet computer—the content management system may generate four different security keys: two keys for Alice and Bob, respectively, on the laptop computer, and two more keys for Alice and Bob, respectively, on the tablet computer. Next, once the key is generated, system 200 can send the candidate security key to the client device (806). If system 200 receives a second request for the new security key, however, system 200 can generate a second candidate security key different from the first candidate security key, and send the second candidate security key to the client device. In such a case, the first candidate security key may be discarded and not used again.

The client device may send a key receipt confirmation message, and system 200 may receive the key receipt confirmation message from the client device (808). The client may have transmitted the newly received candidate key along with or as part of the key receipt confirmation message. The key receipt confirmation message may contain both the active key and the candidate key. Alternatively, the client may have encrypted the key receipt confirmation message with the candidate key. In addition, the message could have also been encrypted with the client device's active key. In order to verify that the client device has received the candidate key, system 200 can determine whether the key receipt confirmation message has been encrypted by the client device using the candidate security key (810). Alternatively, system 200 can determine whether the key receipt confirmation message contains the candidate security key. Sometime after receiving the key receipt confirmation message, system 200 can retire an old security key associated with the client device (812). The old security key can be the active key of the client device prior to the current round of key rotation. In some embodiments, the old security key may be retired only after it is verified that the candidate key was successfully received by the client device. Sometime after receiving the key receipt confirmation message, system 200 may mark the candidate security key as the new security key for the client device (814). From this point on, system 200 may use the new security key (i.e., previously the candidate key) to communicate with and authenticate the client device. Finally, system 200 may send an acknowledgement message to the client device (816). In response, the client device may also mark its candidate key as the new active key and retire the previous active key.

For clarity of explanation, in some instances the present technology may be presented as including individual functional blocks including functional blocks comprising devices, device components, steps or routines in a method embodied in software, or combinations of hardware and software.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs. Moreover, claim language reciting "at least one of" a set indicates that one member of the set or multiple members of the set satisfy the claim.

What is claimed is:

1. A method comprising:
sending, to a server from a client device having a first security key as an active security key, a request for a second security key as a replacement for the first security key, wherein the request is encrypted with the first security key;
receiving a candidate security key from the server;
embedding, before the candidate security key is activated on the client device, the candidate security key in a key receipt confirmation message prior to sending the key receipt confirmation message to the server;
sending the key receipt confirmation message to the server, wherein the key receipt confirmation is encrypted with the candidate security key and the first security key;
receiving, at the client device, an acknowledgment message from the server that the candidate security key is activated on the server;
marking the candidate security key as the active security key; and
when a predetermined time period elapses after sending the key receipt confirmation message without receiving the acknowledgment message, resending the key receipt confirmation message to the server.

2. The method of claim 1, wherein the server is an online synchronized content management system.

3. The method of claim 1, wherein communication between the client device and the server is encrypted with the active security key.

4. The method of claim 3, wherein the communication comprises synchronizing a content item between the client device and the server.

5. The method of claim 1, further comprising:
upon receiving the candidate security key, storing the candidate security key on the client device.

6. The method of claim 1, further comprising:
discarding the first security key after marking the candidate security key as the active security key.

7. The method of claim 1, further comprising:
prior to sending the request:
sending, from the client device to the server, an operation request associated with the first security key; and
receiving a message from the server, the message indicating that the first security key has expired.

8. The method of claim 1, wherein sending the request is triggered by a timer in the client device, the timer periodically triggering the client device to renew the active security key.

9. The method of claim 1, further comprising:
after receiving the candidate security key, receiving an additional candidate security key from the server; and
discarding the additional candidate without sending an additional key receipt confirmation message to the server.

10. A system comprising:
a processor; and
a non-transitory computer-readable storage medium storing instructions which, when executed by the processor, cause the processor to perform operations comprising:
sending, to a server from a client device having a first key as an active security key, a key renewal request, wherein the request is encrypted with the first security key;
receiving a second key from the server;
embedding, before the second key is activated on the client device, the second key in a key receipt confirmation message prior to sending the key receipt confirmation message to the server;
storing the second key;
sending the key receipt confirmation message to the server, wherein the key receipt conformation message is encrypted with the second key and the first key;
receiving, at the client device, an acknowledgment message from the server that the second key has been activated on the server;
upon receiving the acknowledgment message that the second security key has been activated on the server, renewing the active security key of the client device by replacing the first key with the second key, and
when a predetermined time period elapses after sending the key receipt confirmation message without receiving the acknowledgment message, resending the key receipt confirmation message to the server.

11. The system of claim 10, wherein communication between the client device and the server is encrypted using the active security key.

12. The system of claim 10, wherein the confirmation message further contains the first key.

13. A non-transitory computer-readable storage medium storing instructions which, when executed by a processor, cause the processor to perform operations comprising:
receiving, at a server from a client device, a request for a new security key;
generating a candidate security key;
sending the candidate security key to the client device;
receiving a key receipt confirmation message from the client device, wherein the key receipt conformation message is encrypted with a current security key of the client device and the candidate security key before the candidate security key is activated on the client device;
marking, on the server, the candidate security key as the new security key for the client device;
sending an acknowledgment message to the client device that the candidate security key is activated on the server; and
when a predetermined time period elapses after sending the key receipt confirmation message without receiving the acknowledgment message, resending the key receipt confirmation message to the server.

14. The non-transitory computer-readable storage medium of claim 13, storing additional instructions which, when executed by the processor, cause the processor to perform further operations comprising:
after receiving the key receipt confirmation message, retiring an old security key associated with the client device.

15. The non-transitory computer-readable storage medium of claim 13, storing additional instructions which, when executed by the processor, cause the processor to perform further operations comprising:
prior to receiving the request:
receiving, at the server from the client device, an operation request associated with an expired security key;
sending an expired security key notification to the client device; and
denying the client device any further service until the request for the new security key is received from the client device.

16. The non-transitory computer-readable storage medium of claim 13, storing additional instructions which, when executed by the processor, cause the processor to perform further operations comprising:
after receiving the key receipt confirmation message, determining whether the key receipt confirmation message contains the candidate security key.

17. The non-transitory computer-readable storage medium of claim 13, wherein the request is a first request and the candidate security key is a first candidate security key, the non-transitory computer-readable storage medium storing additional instructions which, when executed by the processor, cause the processor to perform further operations comprising:
receiving a second request for the new security key;
generating a second candidate security key different from the first candidate security key; and
sending the second candidate security key to the client device.

* * * * *